United States Patent
Kitagishi

(10) Patent No.: US 10,453,096 B2
(45) Date of Patent: Oct. 22, 2019

(54) MOVEMENT CONTROLLER, MOVEMENT CONTROL METHOD, AND MOVEMENT CONTROL SYSTEM

(71) Applicant: YAHOO JAPAN CORPORATION, Tokyo (JP)

(72) Inventor: Ikuo Kitagishi, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 886 days.

(21) Appl. No.: 14/466,427

(22) Filed: Aug. 22, 2014

(65) Prior Publication Data
US 2015/0269622 A1  Sep. 24, 2015

(30) Foreign Application Priority Data
Mar. 20, 2014  (JP) ................. 2014-058920

(51) Int. Cl.
G06Q 30/02 (2012.01)
G06K 9/00 (2006.01)
G01C 21/34 (2006.01)

(52) U.S. Cl.
CPC ..... *G06Q 30/0266* (2013.01); *G01C 21/3407* (2013.01); *G06K 9/0063* (2013.01); *G06K 9/00671* (2013.01)

(58) Field of Classification Search
CPC ................. G06Q 30/0265; G06Q 30/0266
See application file for complete search history.

(56) References Cited

U.S. PATENT DOCUMENTS

| | | | |
|---|---|---|---|
| 2006/0116070 A1* | 6/2006 | Lauper | G06Q 30/0265 455/3.01 |
| 2007/0117574 A1* | 5/2007 | Watanabe | H04M 1/72536 455/456.1 |
| 2007/0232345 A1* | 10/2007 | Taoka | H04W 4/02 455/522 |
| 2012/0129517 A1* | 5/2012 | Fox | H04L 41/5025 455/425 |
| 2012/0233000 A1* | 9/2012 | Fisher | G06Q 30/02 705/14.71 |
| 2013/0041753 A1* | 2/2013 | Sathyanath | G06Q 30/0261 705/14.58 |
| 2014/0040016 A1* | 2/2014 | Amla | G09F 21/04 705/14.45 |

FOREIGN PATENT DOCUMENTS

| | | |
|---|---|---|
| JP | A-9-244566 | 9/1997 |
| JP | 2002-006784 A | 1/2002 |
| JP | 2003-050559 A | 2/2003 |
| JP | 2011-245925 A | 12/2011 |
| JP | A-2012-14602 | 1/2012 |

OTHER PUBLICATIONS

Dec. 22, 2015 Japanese Office Action issued in Japanese Patent Application No. 2014-058920.

* cited by examiner

*Primary Examiner* — Imran K Mustafa
(74) *Attorney, Agent, or Firm* — Oliff PLC

(57) ABSTRACT

A movement controller includes a search unit, a determination unit and an instruction unit. The search unit searches for locations of information provision target candidate. The determination unit determines a movement form that causes a visual recognition rate of the moving object, which provides the information, to be higher on the basis of a search result. An instruction unit instructs the moving object to move in accordance with the movement form determined by the determination unit.

10 Claims, 13 Drawing Sheets

FIG.4

| MOVEMENT AREA CODE | MOVEMENT AREA |
|---|---|
| 0001 | NAKA WARD, YOKOHAMA |
| 0002 | MIDORI WARD, YOKOHAMA |
| 0003 | KOHOKU WARD, YOKOHAMA |
| ⋮ | ⋮ |

FIG.5

| INFOR-MATION ID | URL | ... |
|---|---|---|
| a01 | www.aaa.com | ... |
| a02 | www.bbb.com | ... |
| a03 | www.ccc.com | ... |
| ⋮ | ⋮ | ⋮ |

FIG.11

| USER ID | NAME | ADDRESS | AGE | GENDER | MAIL ADDRESS | ... |
|---|---|---|---|---|---|---|
| U01 | A TANAKA | MEGURO WARD, TOKYO | 26 | FEMALE | 12ab@yahoo.co.jp | ... |
| U02 | B WATANABE | SHINJUKU WARD, TOKYO | 31 | FEMALE | 34cd@yahoo.co.jp | ... |
| U03 | C SUZUKI | MINATO WARD, TOKYO | 35 | MALE | 56ef@yahoo.co.jp | ... |
| ... | ... | ... | ... | ... | ... | ... |

223

MOVEMENT CONTROLLER, MOVEMENT CONTROL METHOD, AND MOVEMENT CONTROL SYSTEM

CROSS-REFERENCE TO RELATED APPLICATIONS

The present application claims priority to and incorporates by reference the entire contents of Japanese Patent Application No. 2014-058920 filed in Japan on Mar. 20, 2014.

BACKGROUND OF THE INVENTION

1. Field of the Invention

The present invention relates to a movement controller, a movement control method, and a movement control system.

2. Description of the Related Art

Various advertisement forms have been used in advertisements to increase the advertising effectiveness. A mobile advertisement is known as one of the various advertisement forms. In the mobile advertisement, an advertisement is placed on a moving object such as an airship, an airplane, a vehicle, a truck, or a bicycle and the moving object is caused to move in any route, thereby causing the advertisement to attract people's attention. Another technique is available that further increases the advertising effectiveness by mounting a digital signage (electronic signage) as an advertisement display medium on such a moving object.

Patent Document 1: Japanese Laid-open Patent Publication No. 09-244566.

Patent Document 2: Japanese Laid-open Patent Publication No. 2012-014602.

The conventional techniques described above, however, are not always capable of increasing the advertising effectiveness. Specifically, in the conventional techniques, the moving object moves in any route only in accordance with the operation depending on the types of the identified objects and thus persons with interest in the advertisement are not always present on the moving route. The conventional techniques described above are thus not always capable of increasing the advertising effectiveness.

SUMMARY OF THE INVENTION

It is an object of the present invention to at least partially solve the problems in the conventional technology.

According to one aspect of an embodiment, a movement controller includes a search unit that searches for locations of information provision target candidates; a determination unit that determines a movement form causing a visual recognition rate of a moving object providing information to be higher on the basis of a search result of the search unit; and an instruction unit that instructs the moving object to move in accordance with the movement from determined by the determination unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic diagram illustrating an example of an area data storage unit according to the first embodiment;

FIG. 5 is a schematic diagram illustrating an example of a delivery information storage unit according to the first embodiment;

FIG. 11 is a schematic diagram illustrating an example of a user information storage unit according to the second embodiment;

DETAILED DESCRIPTION OF THE PREFERRED EMBODIMENTS

Figure 1:
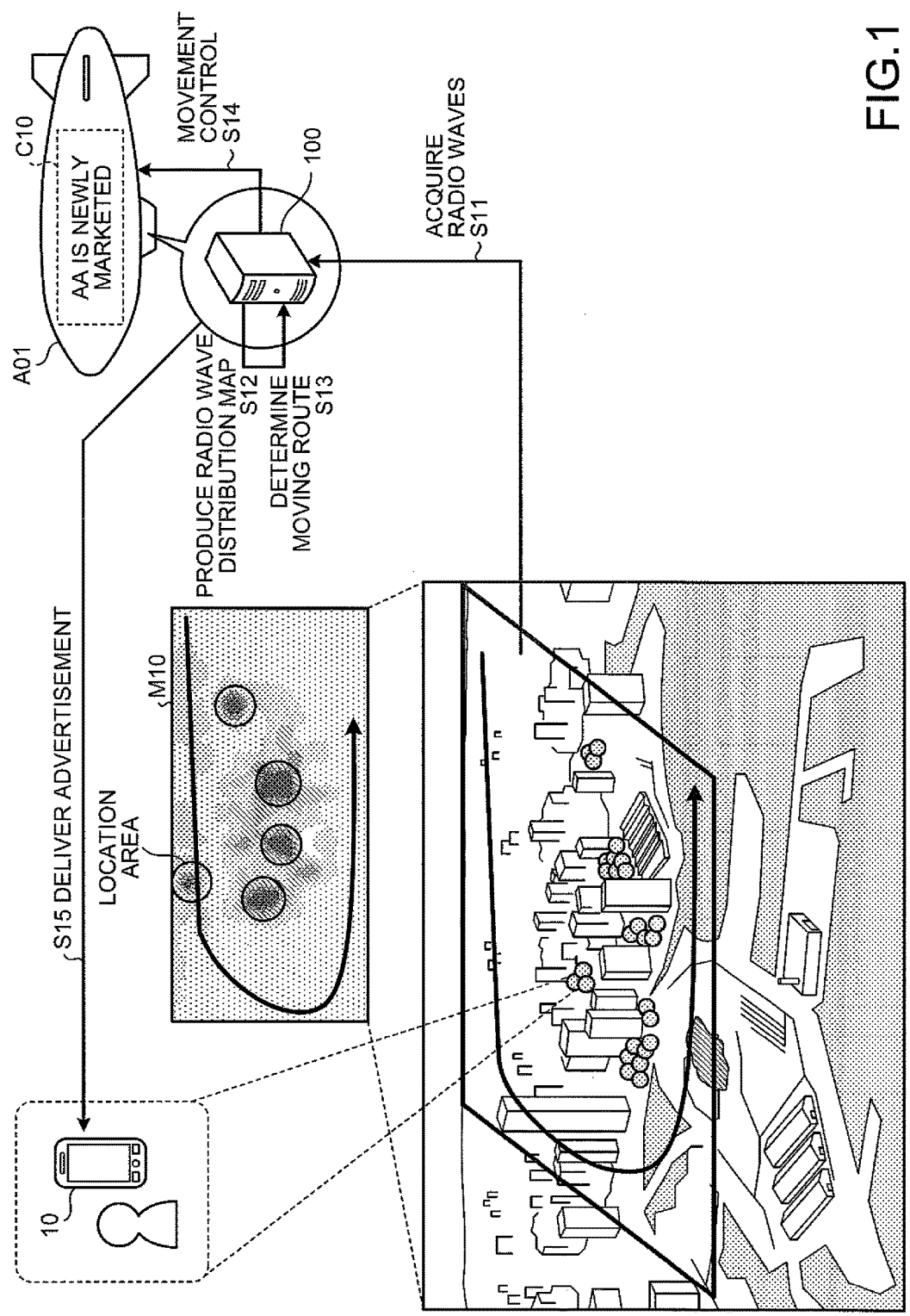
FIG. 1 is a schematic diagram illustrating an example of movement control processing according to a first embodiment of the present invention.

The following describes embodiments of a movement controller, a movement control method, and a movement control system according to the present invention in detail with reference to the accompanying drawings. The embodiments do not limit the movement controller, the movement control method, and the movement control system according to the invention. In the following respective embodiments, the same components are denoted by the same reference numerals and duplicated explanations thereof are omitted.

First Embodiment

1. Movement Control Processing

The following describes an example of movement control processing according to a first embodiment with reference to FIG. 1. FIG. 1 is a schematic diagram illustrating an example of the movement control processing according to the first embodiment. FIG. 1 illustrates an example where a movement controller 100 performs the movement control processing.

In the example of FIG. 1, a terminal device 10 is used by an information provision target candidate and consistently transmits radio waves when the power source is in an on state.

In FIG. 1, an airship is an example of a moving object A01. The moving object A01 is an autonomous airship robot. The moving object A01 provides advertising content C10. The advertising content C10, which is various types of advertising information such as a promotional advertisement of a company or a commercial product, traffic information, area information, and a weather forecast, may be directly written on the moving object A01 or displayed by the digital signage. The moving object A01 moves in a certain area while providing the advertising information as described above. The moving object A01 is not limited to the airship but may be an air plane, a helicopter, a motorbike, a bicycle, a quadrupedal robot, or a drone (unmanned aerial vehicle (UAV)), for example. The moving object A01 may be manned or unmanned.

The movement controller 100 senses information provision target candidates (step S11). Specifically, as illustrated in FIG. 1, the movement controller 100 senses the information provision target candidates by acquiring the radio waves transmitted from the terminal devices 10. The movement controller 100 produces a radio wave distribution map M10 on the basis of the acquired radio waves (step S12). The radio wave distribution map M10 indicates areas where the information provision target candidates are concentrated.

The movement controller 100 determines a moving route of the moving object A01 on the basis of the produced radio wave distribution map M10 (step S13). Specifically, the movement controller 100 identifies areas having a higher distribution density of the radio waves in the produced radio wave distribution map M10 as the areas where the information provision target candidates are concentrated, and determines a route passing near the respective identified location areas.

The movement controller 100 controls the movement of the moving object A01 on the basis of the determined moving route (step S14). The movement controller 100 distributes advertising information to the sensed information provision target candidates (step S15).

As described above, the movement controller 100 according to the first embodiment senses the information provision target candidates by acquiring the radio waves transmitted from the terminal devices 10. The movement controller 100 according to the first embodiment produces the radio wave distribution map M10, and identifies areas having a higher distribution density of the radio waves in the produced radio wave distribution map M10 as the location areas of the information provision target candidates. The movement controller 100 determines the moving route passing near such areas, and causes the moving object A01 to move on the determined moving route, thereby making it possible to increase a visual recognition rate with respect to the advertisement provided by the moving object A01 by the information provision target candidates. As a result, the movement controller 100 can increase the advertising effectiveness of the advertisement provided by the moving object A01.

2. Structure of Movement Control System

Figure 2:
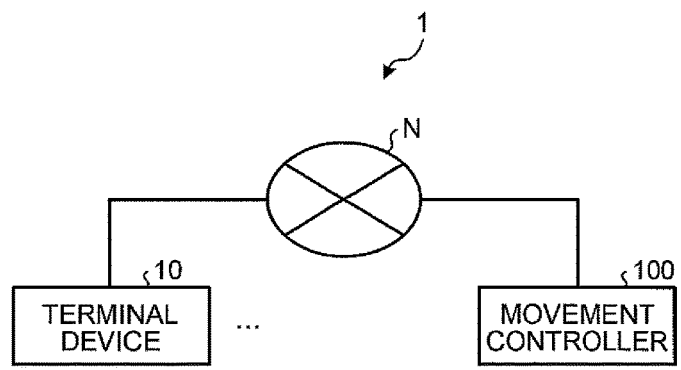
FIG. 2 is a schematic diagram illustrating an example of a structure of a movement control system according to the first embodiment.

The following describes an example of a structure of a movement control system according to the first embodiment with reference to FIG. 2. FIG. 2 is a schematic diagram illustrating an example of the structure of a movement control system 1 according to the first embodiment. As illustrated in FIG. 2, the movement control system 1 includes the terminal device 10 and the movement controller 100. The terminal device 10 and the movement controller 100 are coupled through a network N in a wired or wireless manner so as to enable communication therebetween. The movement control system illustrated in FIG. 2 may include a plurality of terminal devices 10.

The terminal device 10 is used by the information provision target candidate. The terminal device 10 is a mobile phone such as a smartphone, a tablet terminal, a personal digital assistant (PDA), a desktop personal computer (PC), or a notebook PC, for example.

The movement controller 100 senses the information provision target candidates, determines the moving route of the moving object on the basis of the sensing result, and controls the movement of the moving object, as described with reference to FIG. 1.

3. Structure of Movement Controller

Figure 3:
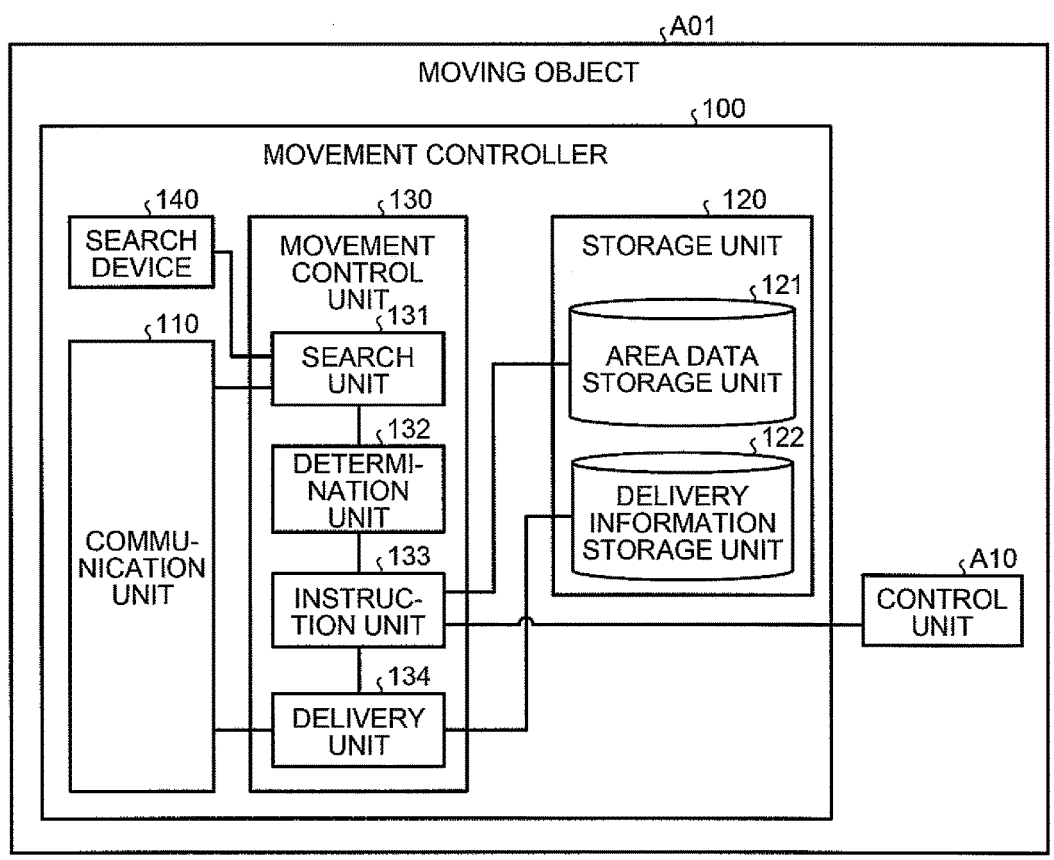
FIG. 3 is a schematic diagram illustrating an example of a structure of a movement controller according to the first embodiment.

The following describes the movement controller 100 according to the first embodiment with reference to FIG. 3. FIG. 3 is a schematic diagram illustrating an example of the structure of the movement controller 100 according to the first embodiment. As illustrated in FIG. 3, the movement controller 100 includes a communication unit 110, a storage unit 120, a movement control unit 130, and a search device 140.

A control unit A10, which is included in the moving object A01, performs various types of control relating to the movement of the moving object A01. The control unit A10 controls a moving speed, a moving altitude, and a moving direction of the moving object A01, for example.

The communication unit 110 is achieved by a network interface card (NIC), for example. The communication unit 110 is coupled to the network N (not illustrated) in a wired or a wireless manner.

The storage unit 120 is achieved by a semiconductor memory element such as a random access memory (RAM) or a flash memory, or a storage device such as a hard disk drive or an optical disk drive. As illustrated in FIG. 3, the storage unit 120 includes an area data storage unit 121 and a delivery information storage unit 122.

The area data storage unit 121 stores therein various types of area information about a movement destination area of the moving object A01. FIG. 4 illustrates an example of the area data storage unit 121 according to the first embodiment. FIG. 4 is a schematic diagram illustrating an example of the area data storage unit 121 according to the first embodiment. In the example illustrated in FIG. 4, the area data storage unit 121 includes items of a "movement area code" and a "movement area".

The moving object A01 is set such that the moving object A01 sequentially moves to the movement areas stored in the area data storage unit 121, for example. Specifically, the movement controller 100 senses the information provision target candidates and controls the movement of the moving object A01 in the respective movement areas in accordance with the moving route determined on the basis of the sensing result. When the moving object A01 completes the movement in a certain movement area, the movement controller 100 causes the moving object A01 to move to the next movement area in accordance with the movement areas stored in the area data storage unit 121. In the example illustrated in FIG. 4, the movement areas are set on a ward basis, but are not limited to being set on a ward basis. The movement controller 100 may not include the area data storage unit 121. When the moving object A01 is a manned moving object, for example, an area serving as the movement destination may be determined on the basis of the judgment of an operator of the moving object A01. In this case, the movement controller 100 may not include the area data storage unit 121.

Referring back to FIG. 3, the delivery information storage unit 122 stores therein various types of information that are delivered by a delivery unit 134 to the terminal device 10. FIG. 5 illustrates an example of the delivery information storage unit 122 according to the first embodiment. FIG. 5 is a schematic diagram illustrating an example of the delivery information storage unit 122 according to the first embodiment. In the example illustrated in FIG. 5, the delivery information storage unit 122 includes items of an "information identification (ID)" and a "uniform resource locator (URL)".

The "information ID" indicates identification information to identify various types of information. The "URL" is data of the URL of a web page in which various types of information are posted.

Referring back to FIG. 3, the movement control unit 130 is achieved by various computer programs (corresponding to an example of a movement control program) stored in an internal storage device of the movement controller 100, the various computer programs being executed by a central processing unit (CPU) or a micro processing unit (MPU) using a RAM as a working area, for example. The movement control unit 130 is achieved by an integrated circuit such as an application specific integrated circuit (ASIC) or a field programmable gate array (FPGA), for example.

As illustrated in FIG. 3, the movement control unit 130 includes a search unit 131, a determination unit 132, an instruction unit 133, and the delivery unit 134, and achieves or executes a function and operation of information processing described below. The internal structure of the movement control unit 130 is not limited to that illustrated in FIG. 3, and may be another structure that performs the information processing described later. The connection relation among the respective processing units included in the movement control unit 130 is not limited to that illustrated in FIG. 3 and may be another connection relation.

The search unit 131 searches for (senses) the locations of the information provision target candidates using the search device 140. Specifically, the search unit 131 searches for the locations of the information provision target candidates by acquiring the radio waves transmitted from the terminal devices 10. The search unit 131 transmits, to the determination unit 132, location information about the radio wave transmission origins included in the acquired radio waves. The search unit 131 transmits, to the determination unit 132, the latitude-longitude coordinates that indicate the location information, for example. When the search device 140 is a radio wave receiver having a plurality of antennae, the search unit 131 may acquire the location of the terminal device 10 on the basis of a difference in receiving timing of radio waves among the antennae.

The determination unit 132 determines, on the basis of a search result by the search unit 131, a movement form that causes the visual recognition rate of the moving object A01, which provides information, to be higher. Specifically, the determination unit 132 determines the moving route that causes the visual recognition rate of the moving object A01, as the moving form, to be higher, on the basis of the number of information provision target candidates in the respective areas. The visual recognition rate is a value that indicates a probability or an expected value of the moving object A01 being visually recognized by users. For example, the determination unit 132 calculates, as the visual recognition rate, the probability or the expected value of the moving object A01 being visually recognized by users for each area having a certain size on the basis of the locations of the users, and determines the movement form such that the area having a higher calculated visual recognition rate is selected. In other words, the determination unit 132 determines the movement form that passes through the location where it is more expected that the moving object A01 is visually recognized by the users. For example, the determination unit 132 produces the radio wave distribution map M10 on the basis of the location information received from the search unit 131. The determination unit 132 identifies the location area of the information provision target candidates on the basis of the distribution density of radio wave in the produced radio wave distribution map M10. For example, the determination unit 132 identifies areas that indicate a distribution density equal to or larger than a certain value as the location areas of the information provision target candidate. The determination unit 132 determines a route passing near the respective identified location areas as the moving route.

As illustrated in the radio wave distribution map M10 of FIG. 1, the determination unit 132 may determine the route passing directly above the respective identified location areas when determining the route. In a more appropriate manner, the determination unit 132 determines, as the moving route, the route along which the moving object A01 moves with a certain distance from each location area. As a result, the determination unit 132 causes the advertising information provided on the side surface of the moving object A01 to be readily visually recognized by persons. The certain distance may be preliminarily set by the determination unit 132.

When a plurality of location areas are located adjacent to one another as illustrated in the radio wave distribution map M10 of FIG. 1, the determination unit 132 may determine, as the moving route, a route passing outside the respective location areas so as to include the whole of them inside the route. When the respective location areas are located far apart from one another, the moving route may pass outside a line connecting the respective location areas so as to include the line inside the route or may pass along the line connecting the respective location areas. Alternately, the moving route may surround each location area. In this way, the determination unit 132 can increase the visual recognition rate with respect to the moving object A01 by the information provision target candidate.

The instruction unit 133 instructs the moving object A01 to move in accordance with the movement form determined by the determination unit 132. Specifically, the instruction unit 133 transmits, to the control unit A10, moving route data determined by the determination unit 132. The instruction unit 133 may control the control unit A10 such that the moving object A01 goes multiple times around the moving route determined by the determination unit 132.

When the moving object A01 completes the movement in the moving route determined by the determination unit 132, the instruction unit 133 may control the control unit A10 such that the control unit A10 causes the moving object A01 to move to the next movement area in accordance with the movement areas stored in the area data storage unit 121.

The delivery unit 134 delivers the advertising information to the terminal devices 10. Specifically, the delivery unit 134 delivers, on the moving route determined by the determination unit 132, a photographed image taken by the moving object A01 together with certain advertising information to the information provision target candidates the locations of which are searched by the search unit 131. For example, the delivery unit 134 may display a certain mail address on the moving object A01 and deliver certain advertising information as an automatic reply to a blank message from the terminal device 10. Alternately, the URL or a QR code (registered trademark) of a web page relating to the advertising information may be displayed on the moving object A01, thereby making it possible for a user to acquire the advertising information using the terminal device 10 without acquiring it through the delivery unit 134.

The search device 140 is a device that searches for the terminal device 10. The search device 140 is a radio wave receiver having an antenna detecting the radio waves transmitted by the terminal device 10, for example.

4. Procedure of Processing Performed by Movement Control System

Figure 6:
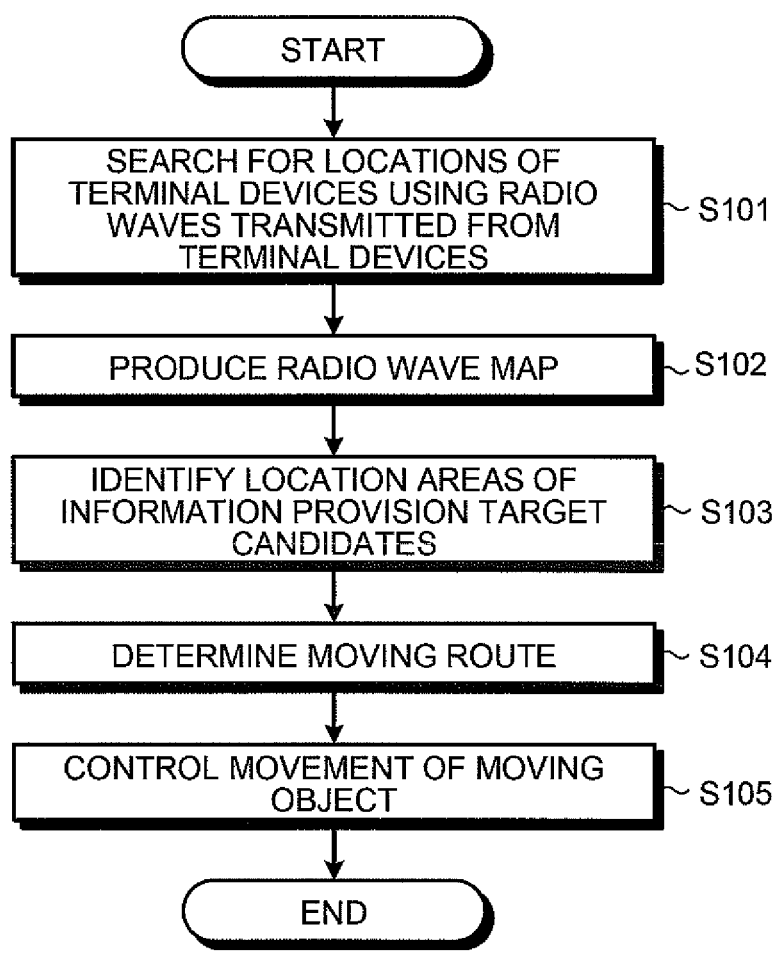
FIG. 6 is a flowchart illustrating a procedure of the processing performed by the movement control system according to the first embodiment.

The following describes a procedure of processing performed by the movement control system according to the first embodiment with reference to FIG. 6. FIG. 6 is a flowchart illustrating a procedure of the processing performed by the movement control system 1 according to the first embodiment.

As illustrated in FIG. 6, the movement controller 100 searches for the locations of the terminal devices 10 by using the radio waves transmitted from the terminal devices 10 (step S101), and produces the radio wave distribution map M10 on the basis of the searched locations of the terminal devices 10 (step S102).

The movement controller 100 identifies the location areas of the information provision target candidates (step S103), determines a route passing near the respective identified location areas as the moving route (step S104), and controls the movement of the moving object A01 on the basis of the determined moving route (step S105).

5. Modifications

The movement controller 100 according to the embodiment may be implemented in various forms besides the embodiment described above. The following describes other embodiments of the movement controller 100.

5-1 Sensing (1)

In the example described above, the search unit 131 senses the locations of the information provision target candidates on the basis of the radio waves transmitted from the terminal devices 10. The search unit 131, however, may sense the locations of the information provision target candidates on the basis of a photographed image of persons or vehicles. For example, the search unit 131 photographs the ground by controlling a camera mounted on the moving object A01 and transmits the photographed image data to the determination unit 132. The determination unit 132 identifies, as the location area of the information provision target candidates, an area where many people gather or a heavily trafficked area on the basis of the received image data. The determination unit 132 may identify people or vehicles from the received image data and produce the distribution maps of people and vehicles. The determination unit 132 identifies the location area of the information provision target candidates on the basis of the distribution density of people or vehicles in the produced distribution map. For example, the determination unit 132 identifies, as the location areas of the information provision target candidate, areas indicating a distribution density equal to or larger than a certain value, and determines, as the moving route, a route passing near the respective identified location areas. The distribution map may be produced separately for people and vehicles or as a single map including both of people and vehicles.

As described above, the movement controller 100 performs sensing on the basis of people or vehicles, and determines the moving route passing near the areas where the information provision target candidates are concentrated on the basis of the sensing result. As a result, the movement controller 100 can increase the visual recognition rate with respect to the moving object A01 by the information provision target candidates. Consequently, the movement controller 100 can increase the advertising effectiveness of the advertisement provided by the moving object A01.

5-2 Sensing (2)

The search unit 131 may sense the location of the information provision target candidate on the basis of terminal location information about the terminal device 10. Specifically, the search unit 131 acquires the terminal location information from the terminal device 10 when the terminal device 10 has a positioning function such as a global positioning system (GPS), and transmits the acquired terminal location information to the determination unit 132.

The determination unit 132 produces a terminal device distribution map on the basis of the terminal location information received from the search unit 131. The determination unit 132 identifies the location areas of the information provision target candidates on the basis of the distribution density of terminal device 10 in the produced terminal device distribution map. For example, the determination unit 132 identifies, as the location areas of the information provision target candidate, areas indicating a distribution density equal to or larger than a certain value relating to the terminal device 10, and determines, as the moving route, a route passing near the respective identified location areas.

As described above, the movement controller 100 performs sensing on the basis of the terminal location information, and determines the moving route passing near the areas where the information provision target candidates are concentrated on the basis of the sensing result. As a result, the movement controller 100 can increase the visual recognition rate with respect to the moving object A01 by the information provision target candidates. Consequently, the movement controller 100 can increase the advertising effectiveness of the advertisement provided by the moving object A01.

5-3 Sensing (3)

The sensing performed by the search unit 131 is based on a viewpoint of the information provision target candidates being highly present in an area where the radio waves, people, vehicles, or the terminal devices are highly concentrated. The following describes an example where users who are probably more interested in the advertising information provided by the moving object A01 are sensed as the information provision target candidates. Specifically, the search unit 131 notifies the information provision target candidates of information about the moving object A01, and searches for (senses) the locations of the information provision target candidates that reply to the notification. The description thereof is made with reference to FIG. 7.

Figure 7:
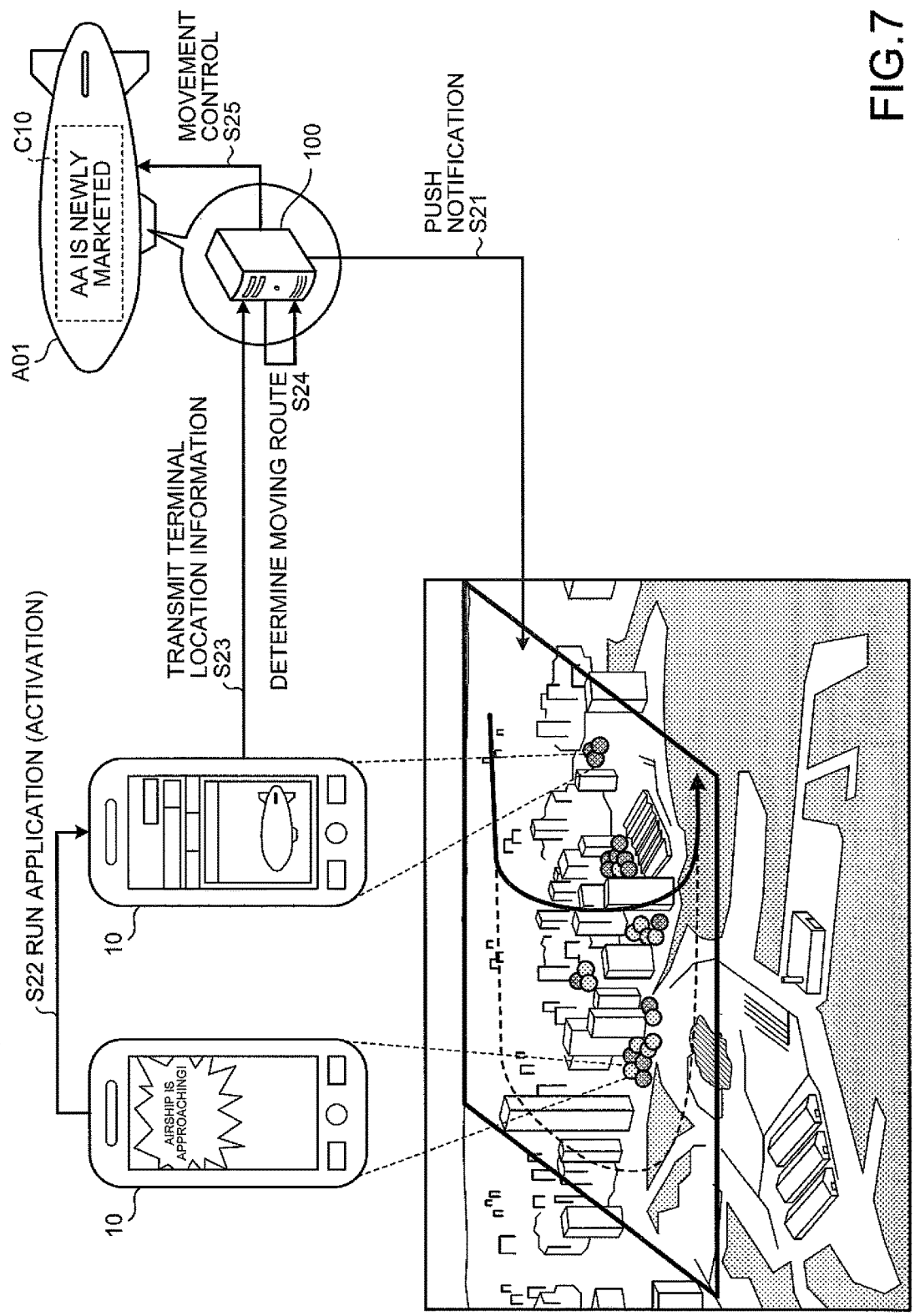
FIG. 7 is a schematic diagram illustrating an example of the movement control processing according to a modification of the first embodiment.

FIG. 7 is a schematic diagram illustrating an example of the movement control processing according to the modification of the first embodiment. FIG. 7 illustrates an example where a certain application (hereinafter may be referred to as an "airship application") for the moving object A01 is installed in the terminal devices 10 in the embodiment illustrated in FIG. 1.

As illustrated in FIG. 7, the movement controller 100 notifies the terminal devices 10 of information about the moving object A01 as a push notification (step S21). Specifically, the search unit 131 of the movement control unit 130 notifies the terminal devices 10 of the information about the moving object A01 (e.g., the moving object A01 is approaching) as the push notification. Such a push notification may be transmitted to the terminal device that downloads the airship application by a mail, or notified to the terminal device that downloads the airship application using sonic waves in a non-audible range or optical communication. When receiving the push notification, the terminal device 10 displays the received push notification in a certain format to notify the user of the information about the moving object A01. In the example of FIG. 7, the terminal device 10 displays a message saying "airship is approaching!" The terminal device 10 may perform the notification with a certain alarm tone instead of the display or may adopt both manners together.

When the user performs operation to activate the airship application, the terminal device 10 runs (activates) a moving object application (step S22). The terminal device 10 transmits the terminal location information to the search unit 131 (step S23). It can be considered that the user who activates the application is probably interested in the advertising information provided by the moving object A01.

When receiving the terminal location information from the terminal device 10 in which the airship application is activated (hereinafter may be referred to as the "activated terminal device 10"), the movement controller 100 determines the moving route on the basis of the received terminal location information (step S24). Specifically, when receiving the terminal location information about the terminal devices 10 from the search unit 131, the determination unit 132 of the movement controller 100 produces the terminal device distribution map on the basis of the received terminal location information. The determined moving route is exemplified with the actual arrow in FIG. 7. The movement controller 100 searches for the locations of the terminal devices that receive the push notification but in which the application is not activated (i.e., non-activated terminal devices) using a known technique, for example. The movement controller 100 produces the terminal device distribution map on the basis of the terminal locations of the activated terminal devices 10 and the non-activated terminal devices. The determination unit 132 identifies the location area of the information provision target candidates on the basis of the distribution density of terminal device 10 in the produced terminal device distribution map. For example, the determination unit 132 identifies, as the location areas of the information provision target candidate, areas indicating a distribution density equal to or larger than a certain value relating to the terminal device 10, and determines, as the moving route, a route passing near the respective identified location areas. The determination unit 132 may determine, as the moving route, a route in which the locations of all of the activated terminal devices 10 are taken into consideration. The determination unit 132 may use weight coefficients each depending on whether the terminal device is activated and determine the route depending on the terminal locations of the respective terminal devices 10. For example, the determination unit 132 may determine the route depending on the terminal locations of the respective terminal devices 10 and furthermore may modify the determined route in accordance with the terminal locations of the activated terminal devices.

The instruction unit 133 of the movement controller 100 controls the movement of the moving object A01 on the basis of the determined moving route (step S25). The delivery unit 134 of the movement controller 100 may deliver the photographed image taken by the moving object A01 to the activated terminal devices 10 together with certain advertising information.

As described above, the movement controller 100 senses the information provision target candidate by receiving the terminal location information about the terminal devices 10 in which the application is activated in response to the push notification. It can be considered that the user who activates the application is interested in the advertising information provided by the moving object A01 and thus activates the application. The movement controller 100 causes the moving object A01 to move in the moving route passing near the areas where the information provision target candidate are concentrated, thereby making it possible to increase the visual recognitions rate with respect to the moving object A01 by the information provision target candidates. Consequently, the movement controller 100 can increase the advertising effectiveness of the advertisement provided by the moving object A01.

Figure 8:
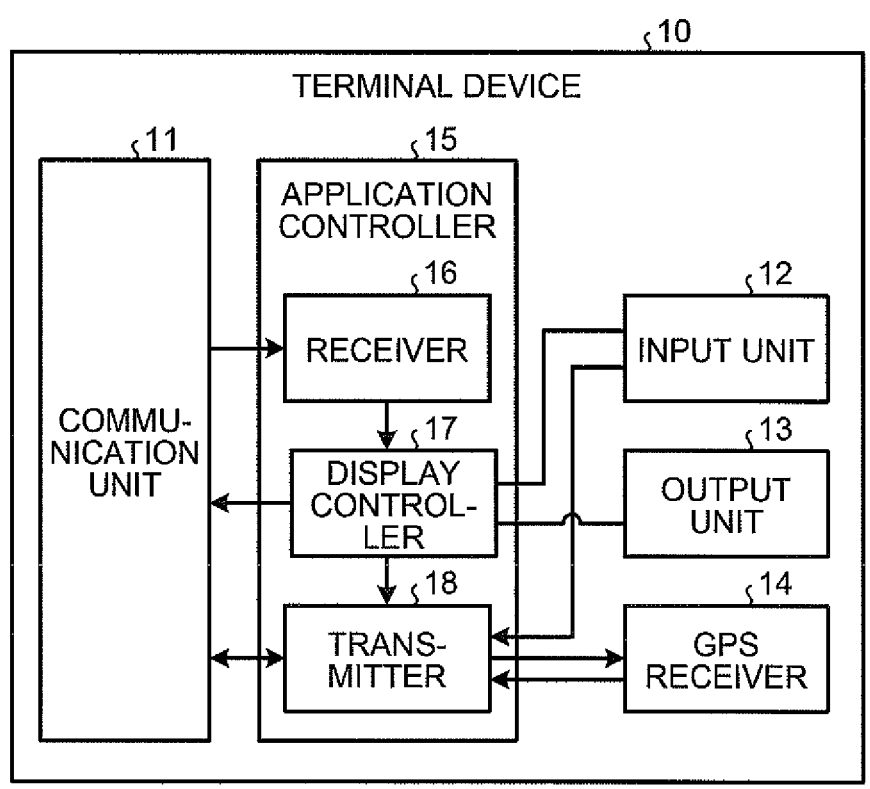
FIG. 8 is a schematic diagram illustrating an example of a structure of a terminal device according to the modifications of the first embodiment.

The following describes the terminal device 10 according to the modifications of the first embodiment with reference to FIG. 8. FIG. 8 is a schematic diagram illustrating an example of the structure of the terminal device 10 according to the modifications of the first embodiment. As illustrated in FIG. 8, the terminal device 10 includes a communication unit 11, an input unit 12, an output unit 13, a GPS receiver 14, and an application controller 15.

The communication unit 11 is achieved by a NIC, for example. The communication unit 11 is coupled to the network N in a wired or a wireless manner.

The input unit 12 is an input device that receives various operations from a user. The input unit 12 is achieved by a keyboard, a mouse, or operation keys, for example. When receiving an application activating operation from a user, the input unit 12 transmits an activation signal to a transmitter 18. The output unit 13 is a display device that displays various types of information. The output unit 13 is achieved by a liquid crystal display, for example. When a touch panel is used for the terminal device 10, the input unit 12 and the output unit 13 are integrated.

The GPS receiver 14 transmits the terminal location information to the transmitter 18 when receiving a request for the terminal location information about the terminal device 10 from the transmitter 18.

The application controller 15 is achieved by various computer programs (an example of a terminal control program) stored in an internal storage device of the terminal device 10, the programs being executed by a CPU or MPU using a RAM as a working area, for example. The application controller 15 is achieved by an integrated circuit such as an ASIC or an FPGA, for example.

The application controller 15 thus structured executes and controls the airship application. The airship application may be downloaded from the movement controller 100 and installed in the terminal device 10 or downloaded from a server (e.g., a server that provides various applications) other than the movement controller 100 and installed in the terminal device 10.

The application controller 15 includes a receiver 16, a display controller 17, and the transmitter 18, and achieves or executes a function and operation of information processing described below. The internal structure of the application controller 15 is not limited to that illustrated in FIG. 8 and may be another structure that performs the information processing described later. The connection relation among the respective processing units included in application controller 15 is not limited to that illustrated in FIG. 8 and may be another connection relation.

The receiver 16 receives the push notification from the movement controller 100. Specifically, the receiver 16 receives the information about the moving object A01 notified by the movement controller 100 as the push notification.

The display controller 17 displays various types of information on the output unit 13, and controls them in accordance with the various operations received by the input unit 12. The display controller 17 according to the modifications displays an input screen for inputting user information, the push notification, and various types of information from the movement controller 100 on the output unit 13, and controls them in accordance with the various operations received by the input unit 12.

The transmitter 18 requests the terminal location information about the terminal device 10 to the GPS receiver 14 when receiving the application activating signal from the input unit 12. When receiving the terminal location information from the GPS receiver 14, the transmitter 18 transmits the acquired terminal location information to the search unit 131 of the movement controller 100. The terminal device 10 may transmit the terminal location information to the movement controller 100 through a certain external server.

In the example described above, the transmitter 18 transmits the terminal location information about the terminal device 10 by being triggered with the activation of the application, thereby making it possible for the search unit 131 to acquire the terminal location information about the activated terminal device 10. The movement controller 100 may preliminarily acquire the terminal location information when the application is installed in the terminal device, for example. In this case, the transmitter 18 may acquire, by being triggered with the activation of the application, a user TD or a terminal ID received by a storage unit (not illustrated) of the terminal device 10 from the user when the application was registered, and transmit the user ID or the terminal ID to the search unit 131. When receiving the user ID or the terminal. ID, the search unit 131 may perform matching between the preliminarily acquired terminal location information and the user ID or the terminal ID, thereby identifying the terminal location information about the activated terminal device 10 from the terminal location information preliminarily acquired by the movement controller 100.

6. Advantages

As described above, the movement controller 100 according to the first embodiment includes the search unit 131, the determination unit 132, and the instruction unit 133. The search unit 131 searches for the locations of the information provision target candidates. The determination unit 132 determines the movement form that causes the visual recognition rate with respect to the moving object, which provides information, to be higher on the basis of the search result by the search unit 131. The instruction unit 133 instructs the moving object A01 to move in accordance with the movement form determined by the determination unit 132.

As a result, the movement controller 100 according to the first embodiment can increase the visual recognition rate with respect to the moving object A01 by the information provision target candidates. Consequently, the movement controller 100 can increase the advertising effectiveness of the advertisement provided by the moving object A01.

The search unit 131 according to the first embodiment notifies the information provision target candidate of information about the moving object, and searches for the locations of the information provision target candidates that reply to the notification.

As described above, the movement controller 100 according to the first embodiment notifies the information provision target candidates of the information about the moving object, thereby making it possible for the information provision target candidates to increase a degree of attention to the moving object. As a result, the movement controller 100 can identify the locations of the information provision target candidate that are interested in the advertising information provided by the moving object, thereby making it possible to determine the moving route based on the identified locations.

The determination unit 132 according to the first embodiment determines the moving route that causes the visual recognition rate with respect to the moving object A01, as the moving form, to be higher on the basis of the number of information provision target candidates.

In this way, the movement controller 100 according to the first embodiment can cause the moving object to move near the areas where the information provision target candidate are concentrated. As a result, the movement controller 100 can increase the visual recognition rate with respect to the moving object A01 by the information provision target candidates. Consequently, the movement controller 100 can increase the advertising effectiveness of the advertisement provided by the moving object.

The delivery unit 134 according to the first embodiment delivers the photographed images taken by the moving object together with certain advertising information to the information provision target candidates the locations of which are searched by the search unit 131, on the moving route determined by the determination unit 132.

In this way, the movement controller 100 according to the first embodiment can deliver the advertising information directly to the information provision target candidates. As a result, the movement controller 100 can further increase the advertising effectiveness of the advertisement provided by the moving object and provide the area information to the information provision target candidates.

Second Embodiment

In a second embodiment, an example is described where the location of the information provision target candidate that has a user attribute of a user who is the provision target of the advertising information provided by the moving object A01.

1. Movement Control Processing

Figure 9:
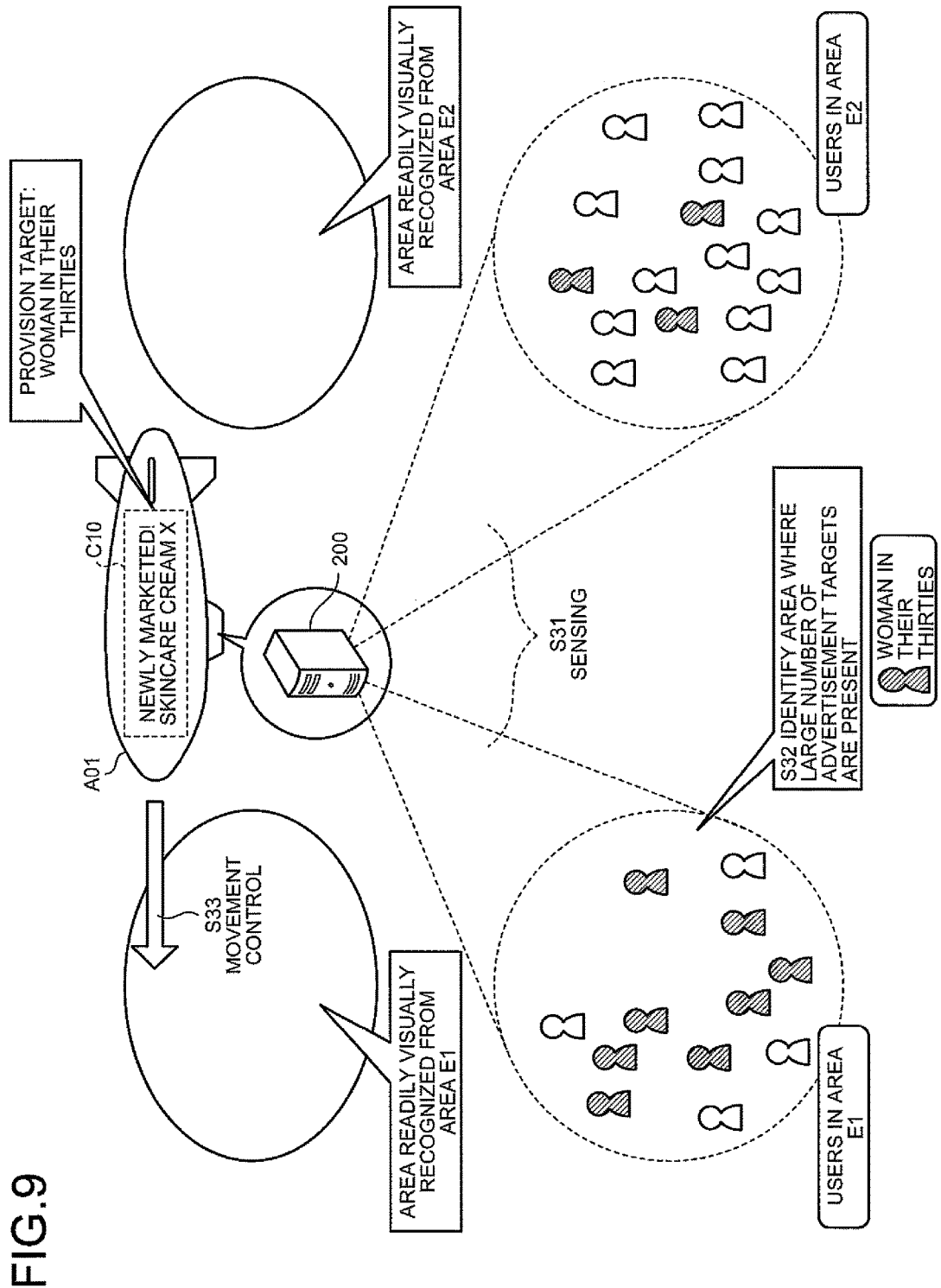
FIG. 9 is a schematic diagram illustrating an example of movement control processing according to a second embodiment.

The following describes an example of the movement control processing according to the second embodiment with reference to FIG. 9. FIG. 9 is a schematic diagram illustrating an example of the movement control processing according to the second embodiment. FIG. 9 illustrates ah example where a movement controller 200 performs the movement control processing.

In FIG. 9, the moving object A01 provides a product advertisement of "Newly marketed! Skincare cream X" as the advertising information. The user attribute of the user who is the provision target of the product advertisement is set to "woman in their thirties". The user attribute may be determined by the product sales company.

As illustrated in FIG. 9, the search unit 131 of the movement controller 200 searches for (senses) the locations of the information provision target candidates that have a user attribute of the user who is the provision target of the advertising information provided by the moving object A01 (step S31). Specifically, the search unit 131 of the movement controller 200 searches for the locations of the information provision target candidates that satisfy the user attribute of "woman in their thirties". For example, the search unit 131 senses the locations by acquiring the terminal location information of the information provision target candidates that satisfy the user attribute of "woman in their thirties" on the basis of the user information received when the airship application was registered. The search unit 131 performs matching between registered information in a user information storage unit 223, which will be described in detail later, and the user attribute "woman in their thirties", and acquires the terminal location information about the terminal device 10 corresponding to the user ID satisfying the user attribute of "woman in their thirties". Specifically, the search unit 131 acquires the terminal location information from the GPS receiver 14 through the transmitter 18 of the terminal device 10 corresponding to the user ID satisfying the user attribute of "woman in their thirties" and senses the information provision target candidate that has the user attribute of "woman in their thirties".

The movement controller 200 identifies the areas where a large number of information provision target candidates that have the user attribute of the user who is the provision target of the product advertisement are present (step S32). Specifically, the determination unit 132 of the movement controller 200 identifies the areas where the number of information provision target candidates that satisfy the user attribute of "woman in their thirties" satisfies a certain number on the basis of the acquired terminal location information. The certain number of candidates may be determined by an administrator of the movement controller 200 or the product sales company. The area identification may be implemented for each of the respective movement areas illustrated in FIG. 4.

In the example of FIG. 9, the number of information provision target candidates in an area E1 that satisfy the user attribute of "woman in their thirties" is 8 out of a total of 12 information provision target candidate. And the number of information provision target candidates in an area E2 that satisfy the user attribute of "woman in their thirties" is 3 out of a total of 15 information provision target candidate. Assuming that the certain number of candidates is set to be equal to or larger than 5, the determination unit 132 causes the moving object A01 to move to the area E1, where the certain number of candidates equal to or larger than 5 is satisfied, prior to the movement area E2 although the total number of information provision target candidates in the area E2 is larger than that of the area E1. The determination unit 132 determines the moving route in the area E1. Specifically, the determination unit 132 produces a terminal distribution map on the basis of the acquired terminal location information, and identifies the areas having a higher distribution density as the location areas of the information provision target candidates on the basis of the terminal distribution density in the produced terminal distribution map. The determination unit 132 determines a route passing near the respective identified location areas as the moving route.

The instruction unit 133 of the movement controller 200 controls the movement of the moving object A01 on the basis of the area information and the moving route that are identified by the determination unit 132 (step S33). The delivery unit 134 of the movement controller 200 may deliver certain advertising information to the terminal devices 10.

2. Structure of Movement Controller

Figure 10:
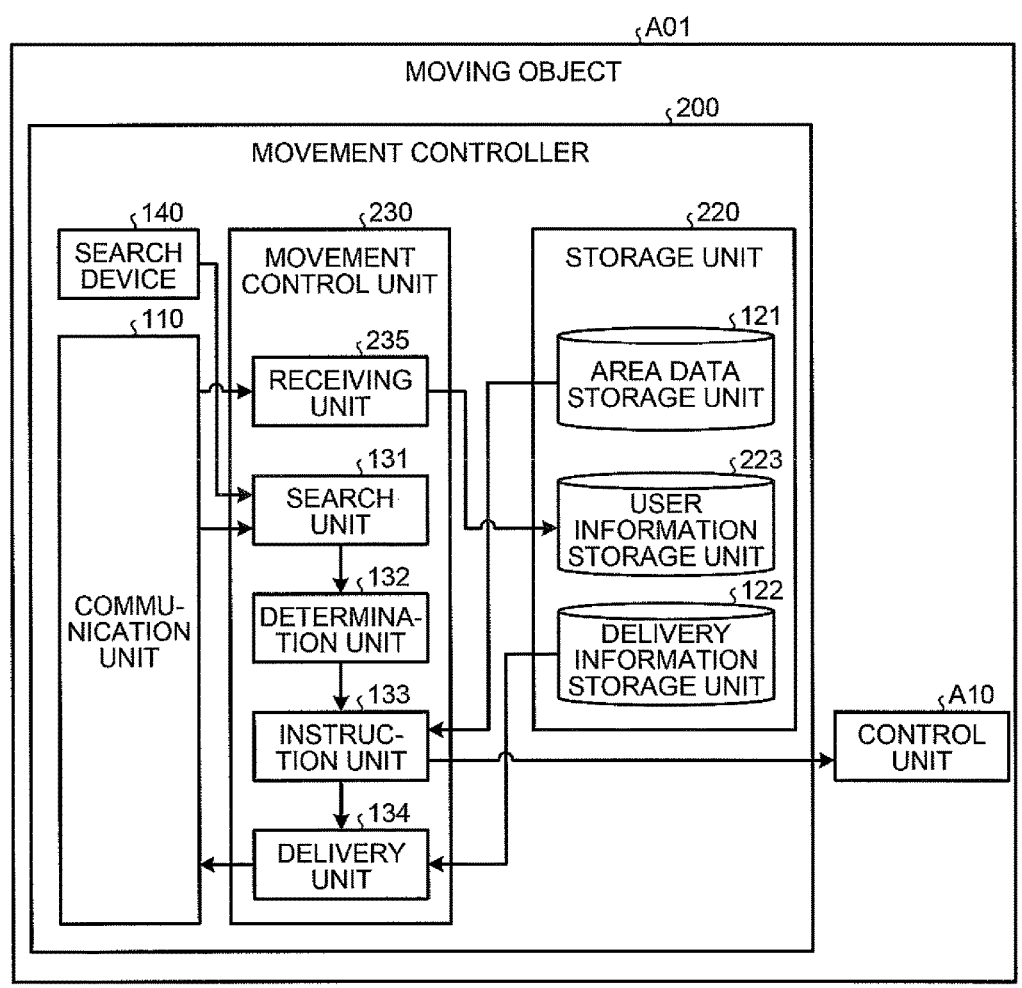
FIG. 10 is a schematic diagram illustrating an example of a structure of a movement controller according to the second embodiment.

The following describes the movement controller 200 according to the second embodiment with reference to FIG. 10. FIG. 10 is a schematic diagram illustrating an example of the structure of the movement controller 200 according to the second embodiment. As illustrated in FIG. 10, the movement controller 200 includes the communication unit 110, a storage unit 220, a movement control unit 230, and the search device 140.

The structure basically follows that of the movement controller 100 according to the first embodiment illustrated in FIG. 3, but differs in that the storage unit 220 includes the user information storage unit 223 and the movement control unit 230 includes a receiving unit 235.

The user information storage unit 223 stores therein the user information about the users of the terminal devices 10. FIG. 11 illustrates an example of the user information storage unit 223 according to the second embodiment. FIG. 11 is a schematic diagram illustrating an example of the user information storage unit according to the second embodiment. In the example illustrated in FIG. 11, the user information storage unit 223 includes items of a "user ID", a "name", an "address", an "age", a "gender", and a "mail address". The user information storage unit 223 may further include a "terminal ID" and an "application ID" as the information items besides the items described above.

The "user ID" indicates identification information to identify the terminal device 10 or the user of the terminal device 10. The "name" indicates the name of the user. The "address" indicates the address of the user. The "age" indicates the age of the user. The "gender" indicates the gender of the user. The "mail address" indicates the mail address of the terminal device 10 used by the user.

A receiving unit 235 receives the user information transmitted from the transmitter 18 of the terminal device 10. Specifically, the receiving unit 235 receives the user information from the transmitter 18 of the terminal device 10, and stores the user information about the terminal device 10 included in the received user information and the user ID in the user information storage unit 223 in association with each other.

In the example illustrated in FIG. 8, the transmitter 18 of the terminal device 10 transmits the terminal location information about the terminal device 10, the terminal location information being received from the GPS receiver 14. The transmitter 18 may transmit the user information as described above. Specifically, the transmitter 18 receives, through the display controller 17, input information received by the input unit 12 as a result of the user's operation. The transmitter 18 transmits the received input information to the receiving unit 235 of the movement controller 200.

The search unit 131 may sense the information provision target candidate that has the user attribute of "woman in their thirties" using the push notification. In the example illustrated in FIG. 11, the search unit 131 sends the push notification to the terminal device. 10 having a user ID of U02, indicating a user satisfying the user attribute of "woman in their thirties". When the application is activated in response to the push notification, the search unit 131 acquires the terminal location information about the activated terminal device 10, thereby sensing the location of the information provision target candidate that has the user attribute of "woman in their thirties".

The second embodiment is not limited to the cooperation with the airship application. For example, the user attribute may be determined from the age, gender, height, or wear of a person on the basis of the photographed image taken from above, and identify the area where a large number of information provision target candidates that have a certain user attribute are included. When determining the moving route in the identified area, the movement controller 200 may use any of the sensing techniques described above.

3. Advantages

The movement controller 200 according to the second embodiment includes the receiving unit 235 that receives the user information from the terminal device 10 and the user information storage unit 223 that stores therein the received user information. The search unit 131 senses the information provision target candidates that have the user attribute of the user who is the provision target of the advertising information provided by the moving object A01 on the basis of the user information stored in the user information storage unit 223. The determination unit 132 causes the moving object A01 to move to the movement area where a larger number of information provision target candidates that satisfy the user attribute are included out of the sensed movement areas.

As described above, the movement controller 200 according to the second embodiment identifies the area where a larger number of information provision target candidates that have the user attribute of the user who is the provision target of the advertising information provided by the moving object A01 are included, and causes the moving object A01 to move preferentially to the identified area. As a result, the movement controller 200 according to the second embodiment can increase the advertising effectiveness of the advertisement provided by the moving object A01.

OTHER EMBODIMENTS

The first and the second embodiments may be implemented in various forms besides the embodiments. The following describes other embodiments.

1. Real Time Sensing

Figure 12:
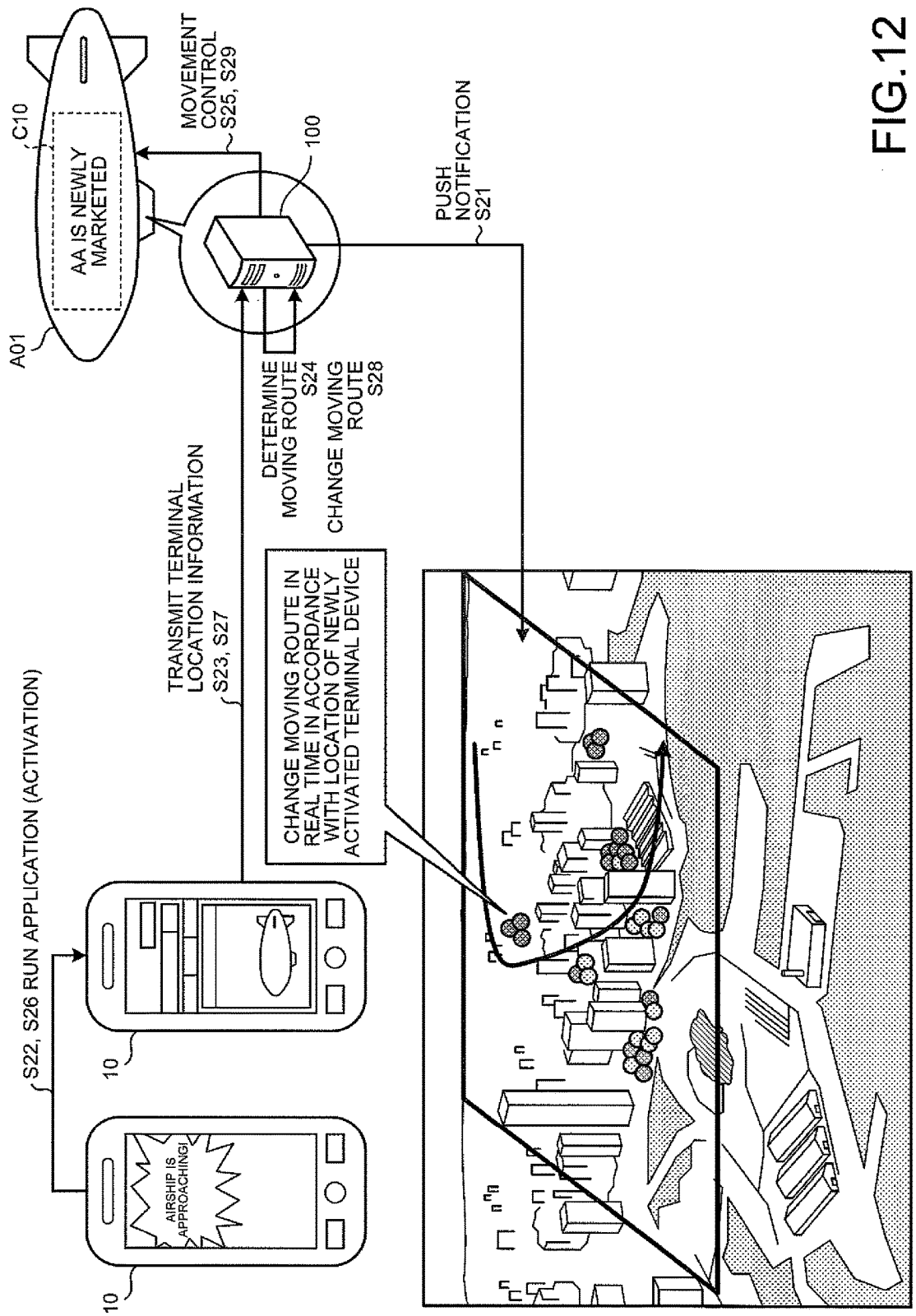
FIG. 12 is a schematic diagram illustrating an example of real time sensing according to another embodiment.

In the embodiments, the search unit 131 senses the information provision target candidate and the determination unit 132 determines the moving route on the basis of the sensing result. The search unit 131 may search for the locations of the information provision target candidates again during the movement of the moving object based on the movement form determined by the determination unit 132, and change the movement form of the moving object A01 on the basis of the search result re-searched by the search unit 131. This processing may be performed in the respective embodiments described above. The description thereof is made with reference to FIG. 12. FIG. 12 illustrates an example of real time sensing according to another embodiment. In the example of FIG. 12, a flow of the processing is described using the example of FIG. 7.

As illustrated in FIG. 7, the movement controller 100 senses the locations of the information provision target candidate using the push notification, determines the moving route on the basis of the sensing result, and controls the movement of the moving object A01 on the basis of the determined moving route (steps S21 to S25).

The search unit 131 periodically performs the sensing during the movement of the moving object A01 (real time sensing). As illustrated in FIG. 12, when the terminal device 10, in which the airship application is not activated so far, is activated by the user during the movement of the moving object A01 (step S26), the activated terminal device 10 transmits the terminal location information to the movement controller 100 (step S27).

The movement controller 100 changes the already determined moving route on the basis of the received terminal location information (step S28), and controls the movement of the moving object A01 on the basis of the changed moving route (step S29).

In this way, the movement controller 100 according to the first and the second embodiments can change the moving route depending on the conditions of the information provision target candidate. As a result, the movement controller 100 according to above-described embodiment can increase the advertising effectiveness of the advertisement information provided by the moving object A01.

2. Cooperation with Communication Service

In the embodiments described above, the delivery unit 134 may deliver an incentive such as a coupon or any information to the information provision target candidate that transmits the photographed image of the moving object taken by the candidate to a certain server. As an example of this case, the movement controller 100 cooperates with a social networking service (SNS) server 300. The SNS is Twitter (registered trademark).

Figure 13:
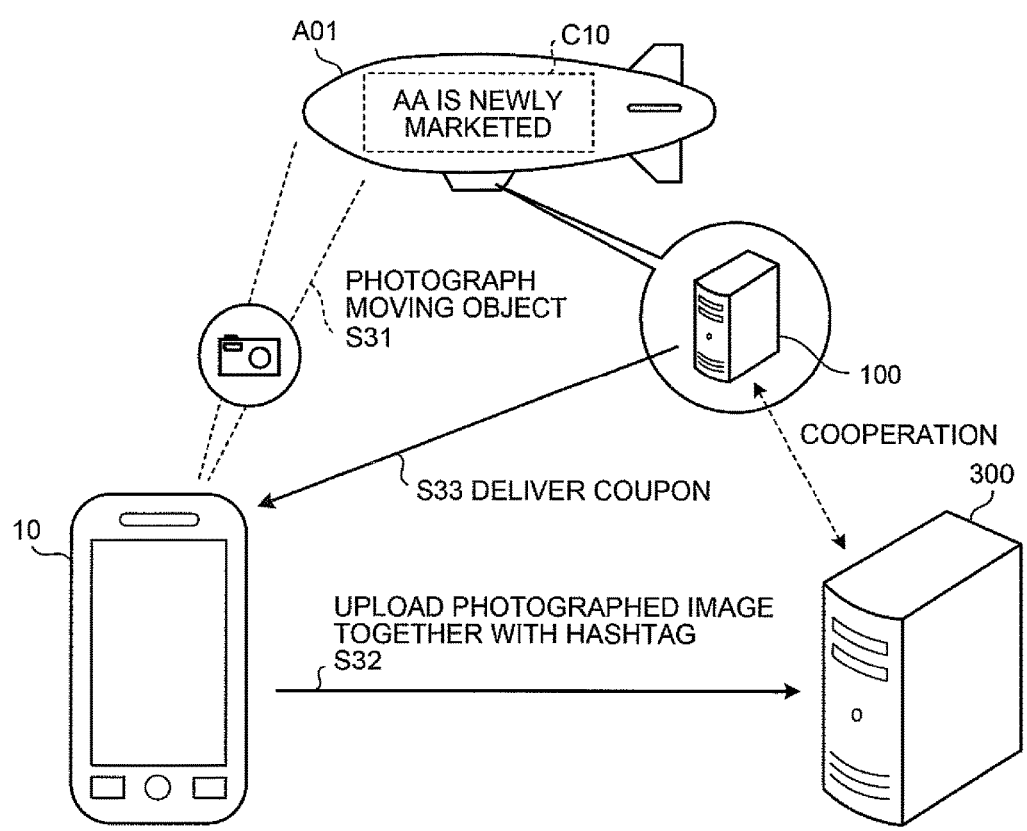
FIG. 13 is a schematic diagram illustrating an example of cooperation between the movement controller and a social network service (SNS) server according to another embodiment.

The following describes an example of the cooperation between the movement controller 100 and the SNS server with reference to FIG. 13. FIG. 13 is a schematic diagram illustrating an example of the cooperation between the movement controller 100 and the SNS server 300 according to another embodiment. As illustrated in FIG. 13, the terminal device 10 photographs the moving object A01 in accordance with various operations of the user (step S31). A request to photograph the moving object A01 may be the push notification from the movement controller 100 to the user or transmitted by the movement controller 100 to the mail address that has been received from the user when the airship application was registered. The request may be acquired by an automatic reply to a blank message transmitted from the terminal device 10 to a mail address displayed on the movement object A01, or by a QR code, which is displayed on the movement object A01, read by the terminal device 10, for example.

The terminal device 10 uploads the photographed image of the moving object A01 together with a certain hashtag (e.g., #airship AS is approaching!) to the SNS server 300 in accordance with the various operations of the user (step S32). When the information about the moving object A01 is uploaded, the delivery unit 134 delivers, to the corresponding terminal device 10, certain reward data such as a coupon or a shopping point (step S33). The movement controller 100 may perform image authentication or location authentication on the photographed image in order to check whether the uploaded photographed image is taken in real time. As a result of such processing, the movement controller 100 makes it possible for the candidates to be more interested in the moving object A01 and the advertisement on the moving object A01.

3. System Structure

Figure 14:
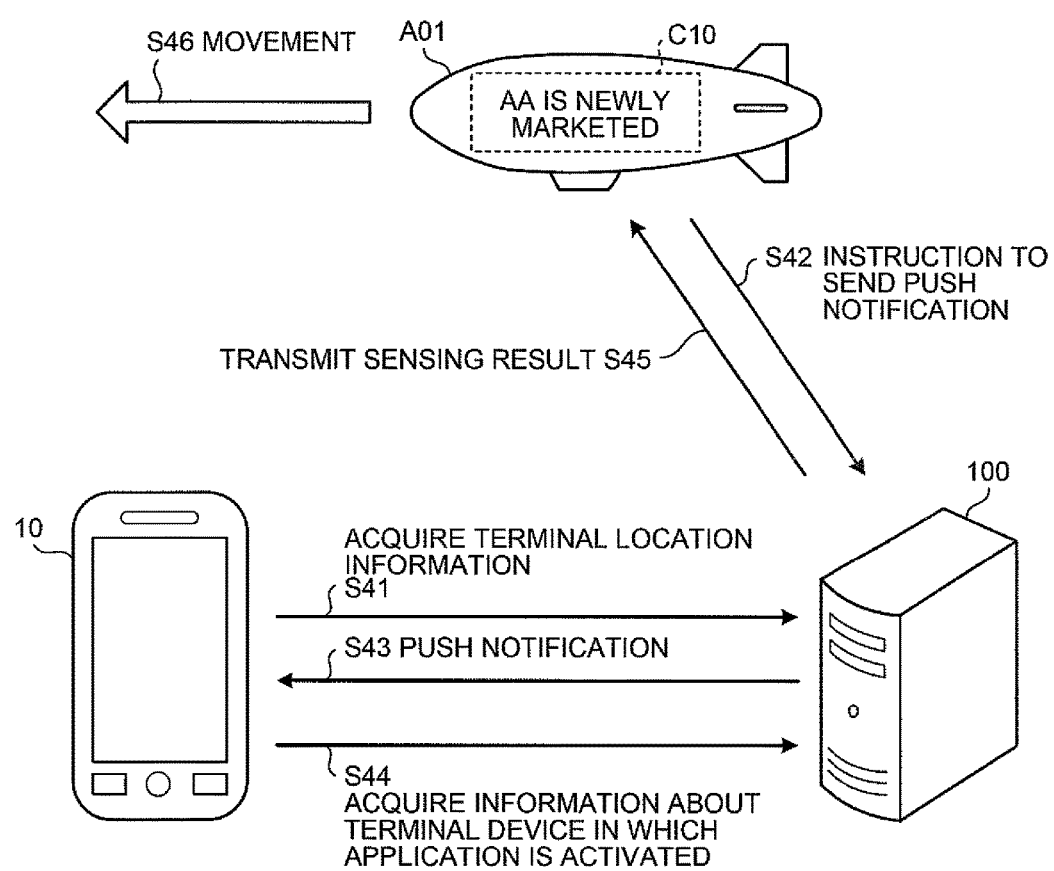
FIG. 14 illustrates an example of the movement control processing by the movement control system according to another embodiment.

In the embodiments described above, the movement controller 100 is mounted on the moving object A01. The movement controller 100, however, may be disposed outside the moving object A01. The embodiments described above may be implemented by the cooperation between the movement controller 100 and the moving object A01 in such a case. This case is described with reference to FIG. 14. FIG. 14 illustrates an example of the movement control processing by the movement control system according to another embodiment. In the example of FIG. 14, a flow of the processing is described using the example of FIG. 7.

As illustrated in FIG. 14, the movement controller 100 acquires the terminal location information about the terminal device 10 (step S41). The terminal location information may be acquired using the GPS receiver 14 of the terminal device 10. When receiving an instruction to send the push notification from the moving object A01 (step S42), the movement controller 100 notifies the terminal device 10 of certain information as the push notification (step S43). The movement controller 100 acquires the terminal location information about the terminal device 10 in which the application is activated in response to the push notification (step S44) and then transmits the acquired terminal location information to the moving object. A01 as a sensing result (step S45). The control unit A10 of the moving object A01 controls the movement of the moving object A01 on the basis of the sensing result received by the moving object A01 or received by a, unit that is included in the moving object A01 and receives the sensing result (step S46).

4. Prediction Technique

The movement controller 100 may predict the movement destination of a user or a vehicle after a passage of a certain period on the basis of its moving direction, and cause the moving object A01 to move to the predicted movement destination in advance.

5. Advertising Effectiveness Analysis (1)

The movement controller 100 may calculate the advertising effectiveness obtained by the movement of the moving object A01. The movement controller 100 may report the calculated result to the advertiser, for example. The following describes a calculation method of the advertising effectiveness when the push notification is used. For example, let the number of terminal devices that receive the push notification be "X" and the number of activated terminal devices responding to the push notification be "Y". The advertising effectiveness, i.e., the number of viewers of the advertising information, can be calculated by the following expression (1).

$$\text{The number of viewers of advertisement} = \{X+Y+(\text{the number of search queries about the moving object } A01)+(\text{the number of new downloads of an application})\} \times \text{coefficient} \quad (1)$$

Where the coefficient is any value calculated from the altitude, size, and moving speed of the moving object A01, the size and visibility of advertisement content C10, an average of human visible ranges, and any parameters usable for measuring the advertising effectiveness.

Let the number of persons to whom the push notification can be sent (the number of installations of an application in a push target area) be "X1", the number of persons who activate the application after receiving the push notification be "Y1", a function indicating the number of persons who do not activate the application even though receiving the push notification and view the airship be "Z(X1,Y1)", the area or the volume that is covered by the push notification be "V", a function indicating the number of persons who infectiously view the airship without installing the application be "F(X1, Y1,V)", and the number of persons who are absent at an assumed location but view the advertisement influenced by the SNS and the like (e.g., the number of search queries about the moving object A01 or the number of new downloads of the application) be "W". The advertising effectiveness, i.e., the number of viewers of the advertising information, can also be calculated by the following expression (2). Any function that can appropriately calculate the number of viewers of the advertisement is applicable to the functions Z and F.

$$\text{The number of viewers of advertisement} = Y1+Z(X1,Y1)+F(X1,Y1,V)+W \quad (2)$$

6. Advertising Effectiveness Analysis (2)

The movement controller 100 may analyze the advertising effectiveness. Specifically, the movement controller 100 may acquire the number of sensings, the number of increases in sensing, the number of activations, the number of increases in activation, the number of accesses to the server, the number of uploaded blogs, the number of tweets, the number of deliveries of coupons, and the number of used delivered coupons, for example, analyze them, and report the analysis result to the advertiser.

7. Identification of Location Area

In the embodiments described above, the determination unit 132 produces the distribution map M10 on the basis of the locations of the sensing targets (radio waves, persons, vehicles, or terminal location information) sensed by the search unit 131, and identifies the area having a higher distribution density in the produced distribution map as the location area of the information provision target candidates. More specifically, the determination unit 132 divides the sensed certain area into certain sections. The determination unit 132 counts the number of information provision target candidates that are present in the section and calculates the distribution density on the basis of a calculation result for each divided section, thereby identifying the location area. The determination unit 132 may actually produce the distribution map M10 on the basis of the counting result, thereby identifying the location area. When the moving object A01 is operated by an operator, the produced distribution map M10 may be reported to the operator.

8. Delivery Unit

The movement controller 100 according to the first embodiment and the movement controller 200 according to the second embodiment each include the delivery unit 134. The delivery unit 134, however, may not be included in the movement controllers 100 and 200.

9. Search Device

The movement controller 100 according to the first embodiment and the movement controller 200 according to the second embodiment each include the search device 140. The search device 140 is not limited to being included in the movement controllers 100 and 200. The search device 140 may be included at any location in the moving object A01.

10. Radio Waves Acquisition Method

In the embodiments described above, the search device 140 receives the radio waves transmitted from the terminal device 10, and the search unit 131 acquires the terminal location information from the radio waves received by the search device 140. The search device 140 may receive the radio waves of the terminal device 10 from a base station for mobile phones or a wireless fidelity (Wi-Fi) router that receives the radio waves, and the search unit 131 may acquire the terminal location information from the radio waves received by the search device 140.

11. Computer Program

Figure 15:
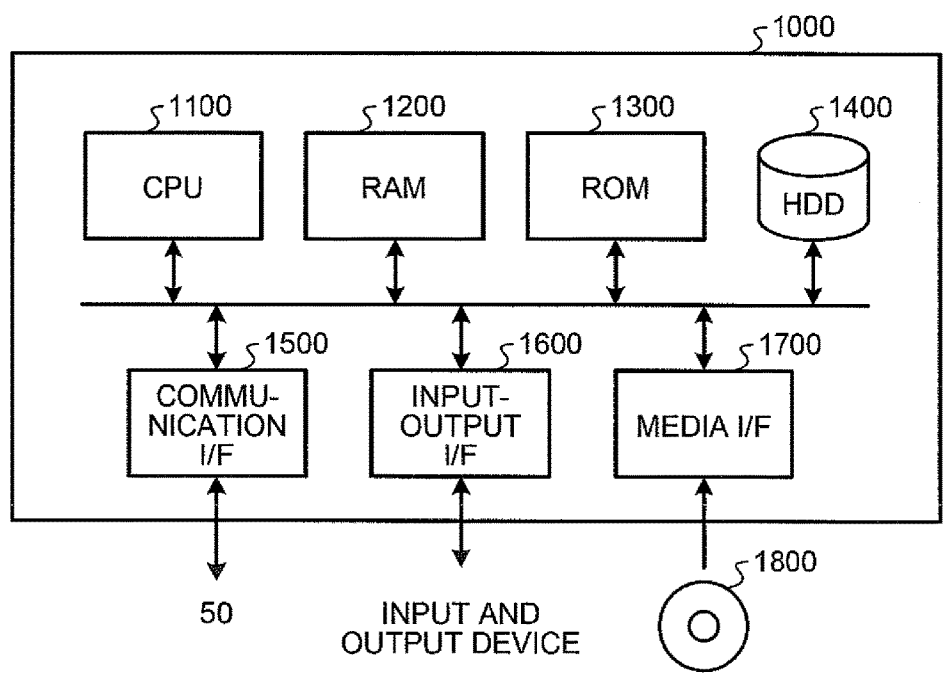
FIG. 15 is a hardware structure illustrating an example of a computer that achieves the functions of the movement controllers.

The movement controller 100 according to the first embodiment and the movement controller 200 according to the second embodiment are achieved by a computer 1000 having the structure illustrated in FIG. 15, for example. The following describes the computer 1000 that achieves the movement controller 100 as an example. FIG. 15 is a hardware structure illustrating an example of the computer 1000 that achieves the functions of the movement controller 100. The computer 1000 includes a CPU 1100, a RAM 1200, a ROM 1300, a hard disk drive (HDD) 1400, a communication interface (I/F) 1500, an input-output interface (I/F) 1600, and a media interface (I/F) 1700.

The CPU 1100 operates on the basis of a computer program stored in the ROM 1300 or the HDD 1400 and controls the respective components. The ROM 1300 stores therein a boot program executed by the CPU 1100 when the computer 1000 is booted and computer programs dependent on the hardware of the computer 1000, for example.

The HDD 1400 stores therein computer programs executed by the CPU 1100 and data used by the programs, for example. The communication interface 1500 receives data from another apparatus through a communication network 50 and sends the data to the CPU 1100. The communication interface 1500 transmits data produced by the CPU 1100 to another apparatus through the communication network 50.

The CPU 1100 controls an output device such as a display or a printer and an input device such as a keyboard or a mouse through the input-output interface 1600. The CPU 1100 acquires data from the input device through the input-output interface 1600. The CPU 1100 outputs produced data to the output device through the input-output interface 1600.

The media interface 1700 reads computer programs or data stored in a recording medium 1800 and provides it to the CPU 1100 through the RAM 1200. The CPU 1100 loads the programs in the RAM 1200 from the recording medium 1800 through the media interface 1700 and executes the loaded programs. The recording medium 1800 is an optical recording medium such as a digital versatile disc (DVD) or a phase change rewritable disc (PD), a magneto-optical recording medium such as a magneto-optical disc (MO), tape medium, a magnetic recording medium, or a semiconductor memory.

For example, when the computer 1000 functions as the movement controller 100 according to the first embodiment, the CPU 1100 of the computer 1000 executes the programs loaded in the RAM 1200 to achieve the functions of the movement control unit 130. The HDD 1400 stores therein the data in the storage unit 120. The CPU 1100 of the computer 1000, which reads the programs from the recording medium. 1800 and executes them, may acquire the programs from another device through the communication network 50.

For example, when the computer 1000 functions as the movement controller 200 according to the second embodiment, the CPU 1100 of the computer 1000 executes the programs loaded in the RAM 1200 to achieve the functions of the movement control unit 230.

12. Others

In the processes described in the embodiments, all or a part of the processes described to be automatically performed can also be manually performed. Alternatively, all or a part of the processes described to be manually performed can also be automatically performed by known methods. In addition, the processing procedures, the specific names, and information including various types of data and parameters described in the above description and the drawings can be changed as required unless otherwise specified.

Furthermore, the components of the devices illustrated in the drawings are functionally conceptual ones, and are not always required to be physically configured as illustrated in the drawings. That is, specific forms of distributions and integrations of the devices are not limited to those illustrated in the drawings. All or a part of the devices can be configured to be functionally or physically distributed or integrated in arbitrary units in accordance with various loads, the usage states, and the like.

The embodiments described above can be appropriately combined without inconsistency among them.

The embodiments of the invention are described in detail with reference to the accompanying drawings as a way of example. The invention can be implemented in other embodiments changed or modified on the basis of the knowledge of the persons skilled in the art besides the embodiments described herein.

The term "unit" described above can be replaced with a "section", a "module", or a "circuit", for example. For example, the search unit can be replaced with the search section or the search circuit.

An aspect of the embodiment has an advantage of increasing the advertising effectiveness.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A movement controller comprising:
a radio wave receiver having a plurality of antennae; and
a processor programmed to:
  acquire, via the radio wave receiver, radio waves transmitted from one or more terminal devices;
  produce a radio wave distribution map on the basis of the acquired radio waves, the radio wave distribution map indicating areas where information provision target candidates are located;
  identify areas having a higher distribution density of the radio waves in the produced radio wave distribution map as the areas where the information provision target candidates are concentrated;
  determine a route passing near the identified areas having the higher distribution density of the radio waves in the produced radio wave distribution map as a movement route for the moving object;
  transmit, to the moving object, control instructions that instruct the moving object to move in accordance with the determined movement route for the moving object;
  notify the one or more terminal devices, which are the information provision target candidates, of information about the moving object;
  search for locations of the information provision target candidates that reply to the notification; and
  continuously monitor, in real-time, radio waves transmitted from the one or more terminal devices, and modify the radio wave distribution map and the movement route in accordance with the locations of the information provision target candidates that reply to the notification, such that the movement route continues to travel through the identified areas having higher distribution density of the radio waves.

2. The movement controller according to claim 1, wherein the processor is further programmed to search for respective locations of information provision target candidates, from among the one or more terminal devices, that have a user attribute related to a provision target of information provided by the moving object.

3. The movement controller according to claim 1, wherein the processor is further programmed to cause information to be transmitted to information provision target candidates, from among the one or more terminal devices, the locations of which are searched by the processor.

4. The movement controller according to claim 3, wherein the processor is further programmed to cause a photographed image taken by the moving object together with certain advertising information to be transmitted to the information provision target candidates.

5. The movement controller according to claim 3, wherein the processor is further programmed to cause the information to be transmitted to the information provision target candidates that have transmitted a photographed image of the moving object to be transmitted to a certain server.

6. The movement controller according to claim 1, wherein the processor is further programmed to:
   re-determine locations of the one or more terminal devices during movement of the moving object based on the determined movement route, and
   change the movement route of the moving object on the basis of the re-determined locations.

7. A movement control method comprising:
   acquiring, by a processor via a radio wave receiver having a plurality of antennae, radio waves transmitted from one or more terminal devices;
   producing a radio wave distribution map on the basis of the acquired radio waves, the radio wave distribution map indicating areas where information provision target candidates are located;
   identifying areas having a higher distribution density of the radio waves in the produced radio wave distribution map as the areas where the information provision target candidates are concentrated;
   determining a route passing near the identified areas having the higher distribution density of the radio waves in the produced radio wave distribution map as a movement route for the moving object;
   transmitting, by the processor, to the moving object, control instructions that instruct the moving object to move in accordance with the determined movement route for the moving object;
   notifying, by the processor, the one or more terminal devices, which are the information provision target candidates, of information about the moving object;
   searching, by the processor, for locations of the information provision target candidates that reply to the notification; and
   continuously monitoring, in real-time, radio waves transmitted from the one or more terminal devices, and modifying the radio wave distribution map and the movement route in accordance with the locations of the information provision target candidates that reply to the notification, such that the movement route continues to travel through the identified areas having higher distribution density of the radio waves.

8. The movement controller according to claim 1, wherein the processor is programmed to determine the areas where the one or more terminal devices are located on the basis of a difference in timings of receiving radio waves by the plurality of antennae.

9. The movement controller according to claim 1, wherein the areas where the one or more terminal devices are located include location information that comprises latitude-longitude coordinates.

10. A movement controller comprising:
   a radio wave receiver having a plurality of antennae; and
   a processor programmed to:
      acquire, via the radio wave receiver, radio waves transmitted from one or more terminal devices;
      produce a radio wave distribution map on the basis of the acquired radio waves, the radio wave distribution map indicating areas where information provision target candidates are located;
      identify areas having a higher distribution density of the radio waves in the produced radio wave distribution map as the areas where the information provision target candidates are concentrated;
      determine a route passing near the identified areas having the higher distribution density of the radio waves in the produced radio wave distribution map as a movement route for the moving object;
      transmit, to the moving object, control instructions that instruct the moving object to move in accordance with the determined movement route for the moving object;
      cause information to be transmitted to the information provision target candidates that have transmitted a photographed image of the moving object to a certain server, from among the one or more terminal devices; and
      continuously monitor, in real-time, radio waves transmitted from the one or more terminal devices, and modify the radio wave distribution map and the movement route in accordance with locations of the information provision target candidates that transmit the photographed image of the moving object, such that the movement route continues to travel through the identified areas having higher distribution density of the radio waves.

* * * * *